(12) United States Patent
Springell et al.

(10) Patent No.: US 10,166,419 B2
(45) Date of Patent: *Jan. 1, 2019

(54) METHOD AND SYSTEM FOR DILUTING MULTIPLE CHEMICAL CONCENTRATES AND DISPERSING RESULTANT SOLUTIONS UTILIZING A SINGLE PORTABLE SOURCE

(71) Applicant: ICL Performance Products LP, St. Louis, MO (US)

(72) Inventors: Gordon Michael Springell, Coeur d'Alene, ID (US); Steven P. Barton, Post Falls, ID (US)

(73) Assignee: PERIMETER SOLUTIONS LP, Webster Groves, MO (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/151,299

(22) Filed: May 10, 2016

(65) Prior Publication Data

US 2016/0250506 A1    Sep. 1, 2016

Related U.S. Application Data

(63) Continuation of application No. 13/796,046, filed on Mar. 12, 2013, now Pat. No. 9,427,609.

(Continued)

(51) Int. Cl.
*B01F 15/02* (2006.01)
*A62C 5/00* (2006.01)
(Continued)

(52) U.S. Cl.
CPC ............... *A62C 5/002* (2013.01); *A62C 5/02* (2013.01); *A62C 5/033* (2013.01);
(Continued)

(58) Field of Classification Search
CPC .................................................. B01F 15/0243
(Continued)

(56) References Cited

U.S. PATENT DOCUMENTS

| 4,244,079 A | 1/1981 | Bane |
| 4,398,605 A | 8/1983 | Conklin et al. |

(Continued)

FOREIGN PATENT DOCUMENTS

| WO | 2006/052245 A1 | 5/2006 |
| WO | 2014/089330 A1 | 6/2014 |

OTHER PUBLICATIONS

International Preliminary Report on Patentability (Chapter II) for PCT/US2013/073376 dated Jan. 5, 2015.

(Continued)

*Primary Examiner* — David L Sorkin
(74) *Attorney, Agent, or Firm* — Thompson Coburn LLP

(57) ABSTRACT

A method and system for diluting and dispersing chemicals that includes a plurality of concentrated liquid chemical containers, a plurality of control valves each in corresponding fluid relationship to the plurality of concentrated liquid chemical containers, at least one additional concentrated chemical container, a positive displacement pump in fluid relationship with the at least one additional concentrated liquid chemical container, a high pressure pump connected in fluid relationship to each of the plurality of control valves, at least one metering device located in fluid relationship between at least one of the plurality of control valves, a fluid pressure adjustment valve connected in fluid relationship to the high pressure pump and a source of solvent or diluent, a hose connected in fluid relationship to the fluid pressure adjustment valve, and an applicator connected to the hose for dispersing a mixture of a solvent or diluent and at least one concentrated chemical.

36 Claims, 2 Drawing Sheets

Related U.S. Application Data

(60) Provisional application No. 61/733,717, filed on Dec. 5, 2012.

(51) Int. Cl.
    *G05D 11/13*         (2006.01)
    *A62C 5/02*          (2006.01)
    *A62C 5/033*        (2006.01)
    *B05B 7/26*          (2006.01)

(52) U.S. Cl.
    CPC ............ *B01F 15/0243* (2013.01); *B05B 7/26* (2013.01); *G05D 11/133* (2013.01)

(58) Field of Classification Search
    USPC ..................... 366/152.2, 181.8, 182.2, 182.4
    See application file for complete search history.

(56) References Cited

U.S. PATENT DOCUMENTS

| | | |
|---|---|---|
| 4,824,342 A | 4/1989 | Buck |
| 4,976,137 A | 12/1990 | Decker et al. |
| 5,085,278 A | 2/1992 | Keltner |
| 5,165,442 A | 11/1992 | Grindley et al. |
| 5,234,268 A | 8/1993 | Homan |
| 5,240,078 A | 8/1993 | Worthington |
| 5,765,644 A | 6/1998 | Arvidson et al. |
| 5,909,775 A | 6/1999 | Grindley |
| 5,934,173 A | 8/1999 | Murphy et al. |
| 6,454,540 B1 | 9/2002 | Terefinko et al. |
| 6,571,882 B2 | 6/2003 | Yen |
| 6,684,959 B1 | 2/2004 | Juidici et al. |
| 6,886,639 B2 | 5/2005 | Arvidson et al. |
| 6,973,975 B1 | 12/2005 | Adamson et al. |
| 7,384,183 B2 | 6/2008 | Smith |
| 7,703,543 B2 | 4/2010 | Waters et al. |
| 7,997,348 B2 | 8/2011 | Hosfield et al. |
| 9,427,609 B2 * | 8/2016 | Springell ............. G05D 11/133 |
| 9,597,646 B2 | 3/2017 | Springell et al. |
| 2005/0257938 A1 | 11/2005 | Elsey |
| 2007/0205220 A1 | 9/2007 | Rudick et al. |
| 2008/0094935 A1 | 4/2008 | Newton et al. |
| 2010/0046316 A1 | 2/2010 | Hughes et al. |
| 2010/0065286 A1 | 3/2010 | Hosfield |
| 2010/0301064 A1 | 12/2010 | Munro |
| 2011/0056707 A1 | 3/2011 | Gamble et al. |
| 2011/0226494 A1 | 9/2011 | Hosfield et al. |
| 2011/0313557 A1 | 12/2011 | Hughes et al. |
| 2014/0153355 A1 | 6/2014 | Springell et al. |
| 2014/0153357 A1 | 6/2014 | Springell et al. |

OTHER PUBLICATIONS

International Search Report and Written Opinion for PCT/US2013/073376 dated Apr. 16, 2014.
Office Action for U.S. Appl. No. 13/796,046 dated Mar. 11, 2016.
Office Action for U.S. Appl. No. 13/796,046 dated Oct. 2, 2015.
Office Action for U.S. Appl. No. 14/098,022 dated Sep. 9, 2016.

* cited by examiner

METHOD AND SYSTEM FOR DILUTING MULTIPLE CHEMICAL CONCENTRATES AND DISPERSING RESULTANT SOLUTIONS UTILIZING A SINGLE PORTABLE SOURCE

CROSS-REFERENCE TO RELATED APPLICATION

This patent application is a continuation of U.S. patent application Ser. No. 13/796,046 filed Mar. 12, 2013, incorporated herein by reference in its entirety and this patent application also claims priority of U.S. Provisional Patent Application No. 61/733,717 filed Dec. 5, 2012, which is hereby incorporated herein by reference in its entirety.

BACKGROUND OF THE INVENTION

There are a number of applications that require the dilution of multiple chemical concentrates for spray application. One type of application that involves applying different types of chemical agents includes firefighting. There are three differing types of firefighting chemicals that are used to fight wild land, municipal, industrial, and structural fires. These include, but are not limited to, long-term retardant, foam, and water enhancing gels. Each of these agents possesses unique properties for fighting fire with particular tactics and tasks depending on the situation. Examples include fire suppression, line building and holding, mop-up/overhaul and prevention. It would be desirable for the fireman to utilize any or all of these options/agents when situations arise so that the most effective firefighting or fire management strategy can be utilized. Since the liquid firefighting agents are offered as concentrates, then these concentrates must be diluted with water prior to application. This requires a proportioning and dispensing system. However, these agent chemical concentrates are generally incompatible with each other and exhibit vastly different properties such as viscosity, flowability, and density. Furthermore, each of the agent firefighting concentrates is mixed with water at unique and different ratios of weight or volume per unit volume of water. Consequently, separate and unique proportioning and discharging systems are needed in order to prepare and use them. The logistics of having three types of hardware systems available at a moment's notice, often in remote and difficult terrain, has precluded the fireman from having the availability of more than one system. Thus, the fireman has been required to predetermine the agent firefighting concentrate that is required prior to going to the place of application. This can often result in having the least desirable agent available for a given situation.

Consequently, there is a significant need for a single mixing system that would be capable of proportioning, diluting, and dispensing any of a number of agent firefighting chemicals easily and quickly. There is also the need to dilute multiple chemicals in agriculture and horticulture applications, and military, civil protection, and environmental protection agency applications such as decontamination or neutralization, e.g., biological, nuclear, and chemical.

The present invention is directed to overcoming one or more of the problems set forth above.

SUMMARY OF INVENTION

In another aspect of the invention, diluting concentrated liquids and dispersing resultant solutions is disclosed. The system includes two or more concentrated liquid chemical containers, two or more control valves each in corresponding fluid relationship to the two or more concentrated liquid chemical containers, a high pressure pump connected in fluid relationship to each of the two or more control valves, a liquid pressure adjustment valve connected in fluid relationship to the high pressure pump and a source of diluent or solvent, a hose connected in fluid relationship to the liquid pressure adjustment valve, and an applicator connected in fluid relationship to the hose for dispersing a diluted solution.

In another aspect of the invention, a system for diluting concentrated liquids and dispersing resultant solutions is disclosed. The system includes two or more concentrated liquid chemical containers, two or more control valves each in corresponding fluid relationship to the two or more concentrated liquid chemical containers, at least one additional concentrated liquid chemical container, a positive displacement pump in fluid relationship with the at least one additional concentrated liquid chemical container, a high pressure pump connected in fluid relationship to each of the two or more control valves; at least one metering device located in fluid relationship between at least one of the two or more control valves, a fluid pressure adjustment valve connected in fluid relationship to the high pressure pump and a source of diluent or solvent, a hose connected in fluid relationship to the fluid pressure adjustment valve; and an applicator connected in fluid relationship to the hose for dispersing a diluted solution.

Yet another aspect of the invention, a system for diluting concentrated liquids and dispersing resultant solutions is disclosed. The system includes a first concentrated liquid chemical container, a first control valve connected in fluid relationship to the first concentrated liquid chemical container, a second concentrated liquid chemical container, a second control valve connected in fluid relationship to the second concentrated liquid chemical container, a first metering device connected in fluid relationship to the second control valve, a third concentrated liquid chemical container, a third control valve connected in fluid relationship to the third concentrated liquid chemical container, a second metering device connected in fluid relationship to the third control valve, a positive displacement pump in fluid relationship to a second metering device, a high pressure pump connected in fluid relationship to the first control valve and the first metering device, a fluid pressure adjustment valve connected in fluid relationship to the high pressure pump, the positive displacement pump, and a source of diluent or solvent, a maximum fluid pressure sensor connected in fluid relationship to the fluid pressure adjustment valve, a system fluid pressure gauge connected in fluid relationship to the maximum fluid pressure sensor, a minimum fluid pressure sensor connected in fluid relationship to the system fluid pressure gauge, a hose connected in fluid relationship to the minimum fluid pressure sensor; and an applicator connected in fluid relationship to the hose for dispersing a diluted solution.

Still yet another aspect of the present invention is that a method for a system for diluting concentrated liquids and dispersing resultant solutions is disclosed. The method includes utilizing two or more concentrated liquid chemical containers connected to two or more control valves each in corresponding fluid relationship, utilizing at least one additional concentrated liquid chemical container that is connected in fluid relationship to a positive displacement pump, utilizing a high pressure pump that is connected in fluid relationship to each of the two or more control valves, utilizing at least one metering device located in fluid relationship between at least one of the two or more control valves and the high pressure pump, utilizing a fluid pressure adjustment valve connected in fluid relationship to the high pressure pump and a source of diluent or solvent, and utilizing a hose connected in fluid relationship to the fluid pressure adjustment valve and having a nozzle connected in fluid relationship to the hose for dispersing a diluted solution.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

Figure 1:
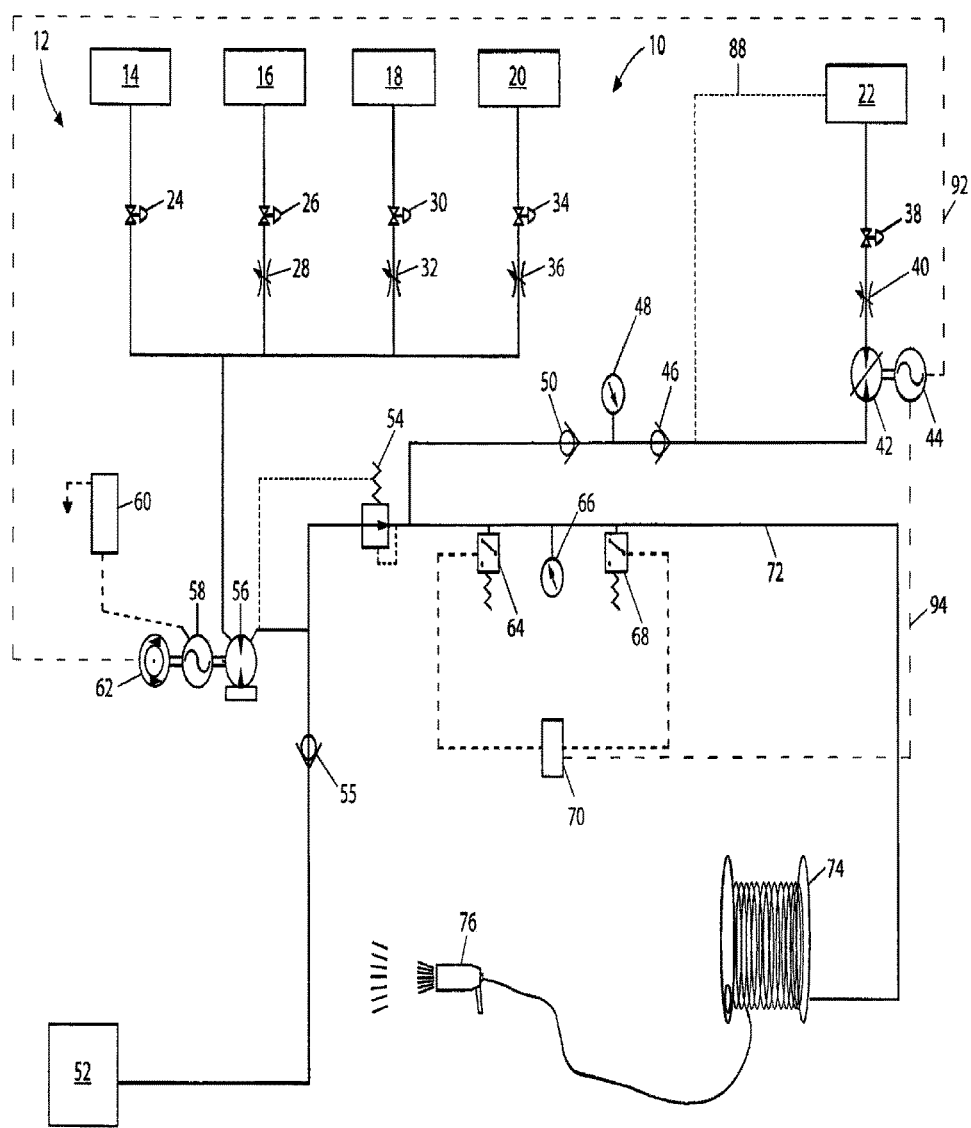
FIG. 1 is a general schematic diagram of a schematic flowchart of a system for diluting multiple chemical concentrates and dispersing utilizing a single portable source associated of the present invention.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

Referring now to a general embodiment of the present invention in FIG. 1, a system for diluting multiple chemical concentrates and dispersing resultant solution is generally indicated by numeral 10. This general chemical dilution and dispersion system 10 includes a plurality of concentrated liquid chemical containers 12. Although five (5) are shown, any of a wide number of concentrated liquid chemical containers, e.g., tanks, could be utilized with the present invention. The first concentrated liquid chemical container is indicated by numeral 14. The first concentrated liquid chemical container 14 is connected in fluid relationship to a first control valve 24. The first control valve 24 is in fluid relationship to a high pressure pump 56. The first control valve 24 can turn the flow of concentrated liquid chemical from the first concentrated liquid chemical container 14, on and off, that travels to the high pressure pump 56.

There is a second concentrated liquid chemical container 16 that is connected in fluid relationship to a second control valve 26 that can turn the flow of concentrated liquid chemical from the second concentrated liquid chemical container 16, on and off, that travels to a first manual metering device 28, which can be preset to release a fixed amount of liquid chemical concentrate, to the high pressure pump 56.

Additionally, there may optionally be a third concentrated liquid chemical container 18 that is connected in fluid relationship to a third control valve 30 that can turn the flow of concentrated chemical from the third concentrated liquid chemical container 18, on and off, that travels to a second manual metering device 32, which can be preset to release a fixed amount of liquid chemical concentrate, to the high pressure pump 56.

Furthermore, there may optionally be a fourth concentrated liquid chemical container 20 that is connected in fluid relationship to a fourth control valve 34 that can turn the flow of liquid chemical concentrate from the fourth concentrated liquid chemical container 20, on or off, that travels to a third manual metering device 36, which can be preset to release a fixed amount of liquid chemical concentrate, to the high pressure pump 56. The metering devices 28, 32, 36 and 40 in the present invention are used to produce the desired chemical to diluent or solvent ratio.

In addition, there can be a fifth concentrated liquid chemical container 22 that is connected in fluid relationship to a fifth control valve 38 that can turn the flow of concentrate from the fifth concentrated liquid chemical container 22, on or off, that travels to a fourth manual metering device 40, which can be preset to release a fixed amount of firefighting liquid chemical concentrate to a positive displacement pump 42 that is operatively connected to a motor 44 for powering the positive displacement pump 42. The use of a positive displacement pump is for liquid chemical concentrates having a high viscosity, e.g., gel concentrates.

A bypass relief line 88 can be utilized to divert excess liquid chemical concentrate back into the fifth concentrated liquid chemical container 22, especially after the positive displacement pump 42 ceases to operate. The first concentrated liquid chemical container 14 would also require a metering device if the concentrated chemical is not concentrated above a predetermined valve, e.g., from about three percent (3%) to about twenty-five percent (25%). This factor depends on the size of the liquid passageway between the first concentrated liquid chemical container 14 and the high pressure pump 56. For example, a typical hose bore is approximately three-fourths of an inch thick walled.

Illustrative, but nonlimiting, examples of concentrated liquid chemical containers 14, 16, 18, 20 and 22 include polyurethane tanks that are an inductor style such as those manufactured by Den Hartog Industries, Inc., having a place of business at 4010 Hospers Drive South, Hospers, Iowa 51238. This may include an Ace-Roto Mold™ thirty or fifteen gallon conical tank. However this size can be increased depending on the capacity of the storage unit utilized for a supply of water.

Illustrative, but nonlimiting, preferred examples of control valves 24, 26, 30, 34 and 38 include electrically actuated ball valves such as the E12™ and E16™ series manufactured by Hyvair Corp., having a place of business at 31341 Friendship Drive, Magnolia, Tex. 77355. However, simple manual brass ball valves may suffice such as the Part No. 01728170 manufactured by Smith-Cooper International, having a place of business at 2867 Vail Avenue, Commerce, Calif. 90040.

Illustrative, but nonlimiting, examples of a first manual metering device 28, second manual metering device 32, and third manual metering device 36 includes a PMV-B Metering Valve made of bronze by EK Engineering, having a place of business at 16981 Fairfield Circle, Huntington Beach, Calif. 92649. The fourth manual metering device 40 may be manual and operator adjustable. An illustrative, but nonlimiting, example includes a rheostat such as a 25 Ohm, 3 Watt, Model 271-265 sold by Radio Shack Corporation, having a place of business at 300 RadioShack Circle, Fort Worth, Tex. 76102. This fourth manual metering device 40 is wired into the control for the motor 44 for the positive displacement pump 42. The motor 44 does not typically operate at full speed but is designed to run slow that is sufficiently above any likely stall point under full pumping load of the positive displacement pump 42 so any alteration in current will allow the positive displacement pump 42 to work slightly slower or slightly faster. The diameter of the connecting hoses utilized throughout this system play a role in determining the desired chemical to water mix ratio.

An illustrative, but nonlimiting, example of a positive displacement pump 42 includes a hydraulic gear pump such as Barnes 2690163 manufactured by Haldex AB, having a place of business at 10930 N Pomona Avenue, Kansas City, Mo. 64153 or a Concentric™ GC Series or D series two-stage high/low hydraulic pump manufactured by Concentric Rockford Inc., having a place of business at 2222 15th Street, Rockford, Ill. 61104. An illustrative, but nonlimiting, example of the motor 44 for powering the positive displacement pump 42 includes a LEESON® ¾horsepower, 1,800 rpm electric motor manufactured by Leeson Electric Corporation, having a place of business at 2100 Washington Street, Grafton, Wis. 53024.

Liquid chemical concentrate can flow from the positive displacement pump 42 through a first check valve 46 and then through a first pressure gauge 48 and then through a second check valve 50. Excess liquid chemical concentrate from the positive displacement pump 42 can then be returned to the fifth concentrated chemical container 22 through a bypass relief line 88. An illustrative, but nonlimiting, example of check valves include the Merrill 1000 series manufactured by Merrill Manufacturing, having a place of business at 315 Flindt Drive, Storm Lake, Iowa 50588. Illustrative, but nonlimiting, examples of pressure gauges include liquid filled pressure gauges such as PGL check valves, including the Merrill 1000 series manufactured by Merrill Manufacturing, having a place of business at 315 Flindt Drive, Storm Lake, Iowa 50588. The check valves 46 and 50 function to make sure there is only a one-way flow of chemical concentrate.

For dilution, any type of diluent or solvent may be utilized. Diluent or solvent can be provided from a variable capacity storage container 52 through a third check valve 55 that feeds into a manual fluid pressure adjustment valve 54, that preferably includes a bypass to avoid surge or excess system pressure. The liquid concentrated chemicals from the first concentrated liquid chemical container 14, second concentrated liquid chemical container 16, the third concentrated liquid chemical container 18, and the fourth concentrated liquid chemical container 20 are fed into a high pressure pump 56. An illustrative, but nonlimiting, example of a variable capacity diluent or solvent tank 52 would be such as those manufactured by Den Hartog Industries, Inc., having a place of business at 4010 Hospers Drive South, Hospers, Iowa 51238. This may include an Ace-Roto Mold™ one hundred to five hundred gallon tank that can be easily disconnected and replaced with a lifting cradle (not shown) and is preferably, but not necessarily, made of polyurethane.

The high pressure pump 56 is preferably powered by a motor 58, which may be gas or electric. The motor 58 can be started by a battery 60 and potentially and preferably charged through an electric alternator 62. The electric alternator 62 is electrically connected via electrical conductor 92 to motor 44. Although not shown, the battery 60 may also be electrically connected via electrical conductor 92 to motor 44. The chemicals exiting the manual liquid pressure adjustment valve 54 are then combined with the concentrated chemicals from the fifth concentrated chemical tank 22 at the high pressure end of the system. This prevents interaction of potentially incompatible chemicals prior to encountering a high pressure stream of diluent or solvent.

An illustrative, but nonlimiting, example of a motor 58 would include a Model GX390™ (10 Ampere, Electric Start) manufactured by American Honda Motor Co., Inc., having a place of business at 4900 Marconi Dr., Alpharetta, Ga. 30005. Moreover, an illustrative, but nonlimiting, example of an electric alternator 62 would include a DELCO® 10 si, 55 Ampere, 12 Volt, manufactured by ACDelco, having a place of business at 6200 Grand Pointe Drive, Grand Blanc, Mich. 48439. Any of a wide variety of batteries will suffice, including a 12 Volt, 74 Amperes-hour, Gel Cell Sealed Lead Acid Battery such as that available through Battery Mart, having a place of business at 1 Battery Drive, Winchester, Va. 22601.

The combination of diluent or solvent and concentrated chemicals then flows through a maximum fluid pressure sensor 64, which is preset at a predetermined pressure, the fluid pressure is measured by a system fluid pressure gauge 66, and then passes through a minimum fluid pressure sensor 68. There is an adjustable speed controller 70 that is electrically connected to the maximum fluid pressure sensor 64 and the minimum fluid pressure sensor 68 for controlling the flow of chemicals and water through the hose 72. The adjustable speed controller 70 is electrically connected via electrical conductor 94 to motor 44. Illustrative, but nonlimiting, examples of pressure sensors 64 and 68 include PS-150 manufactured by Northman (Asia) Pte Ltd, having a place of business at #07-14 196 Pandan Loop, Singapore 12384. Illustrative, but nonlimiting, examples of a system fluid pressure gauge 66 includes liquid filled pressure gauges such as PGL check valves, including the Merrill 1000 series manufactured by Merrill Manufacturing, having a place of business at 315 Flindt Drive, Storm Lake, Iowa 50588. An illustrative, but nonlimiting, example of an adjustable speed controller 70 includes a toggle switch from Waytek, Inc., having a place of business at 2440 Galpin Court, Chanhassen, Minn. 55317.

Preferably, the hose 72 is wound around a hose reel 74 and unwound when a fire needs to be put out, and then rolled back again on the hose reel 74 when the fire is over. Attached to the end of the hose 72 is an applicator 76 with preferably a variable flow pattern, which is operator adjustable, for dispersing the combination of solvent or diluent and chemical concentrate.

The combination of a high pressure pump 56, an applicator 76, e.g., a nozzle or spray gun, a manual fluid pressure adjustment valve 54 and a third check valve 55 can be found in the illustrative, but nonlimiting, example, of a FOAM PRO® TURBO STREAM® high pressure foam system manufactured by Pentair Ltd., having a place of business at 375 5th Avenue NW, New Brighton, Minn. 55112.

An illustrative, but nonlimiting, example of a hose 72 can include a high pressure, one-half inch hose manufactured by Unisource Manufacturing, Inc., having a place of business at 8040 NE 33$^{rd}$ Drive, Portland, Oreg. 97211. An illustrative, but nonlimiting, example of a hose reel is an E-1500™ reel, manufactured by Hannay Reels, Inc. 553 State Route 143, Westerlo, N.Y. 12193.

Figure 2:
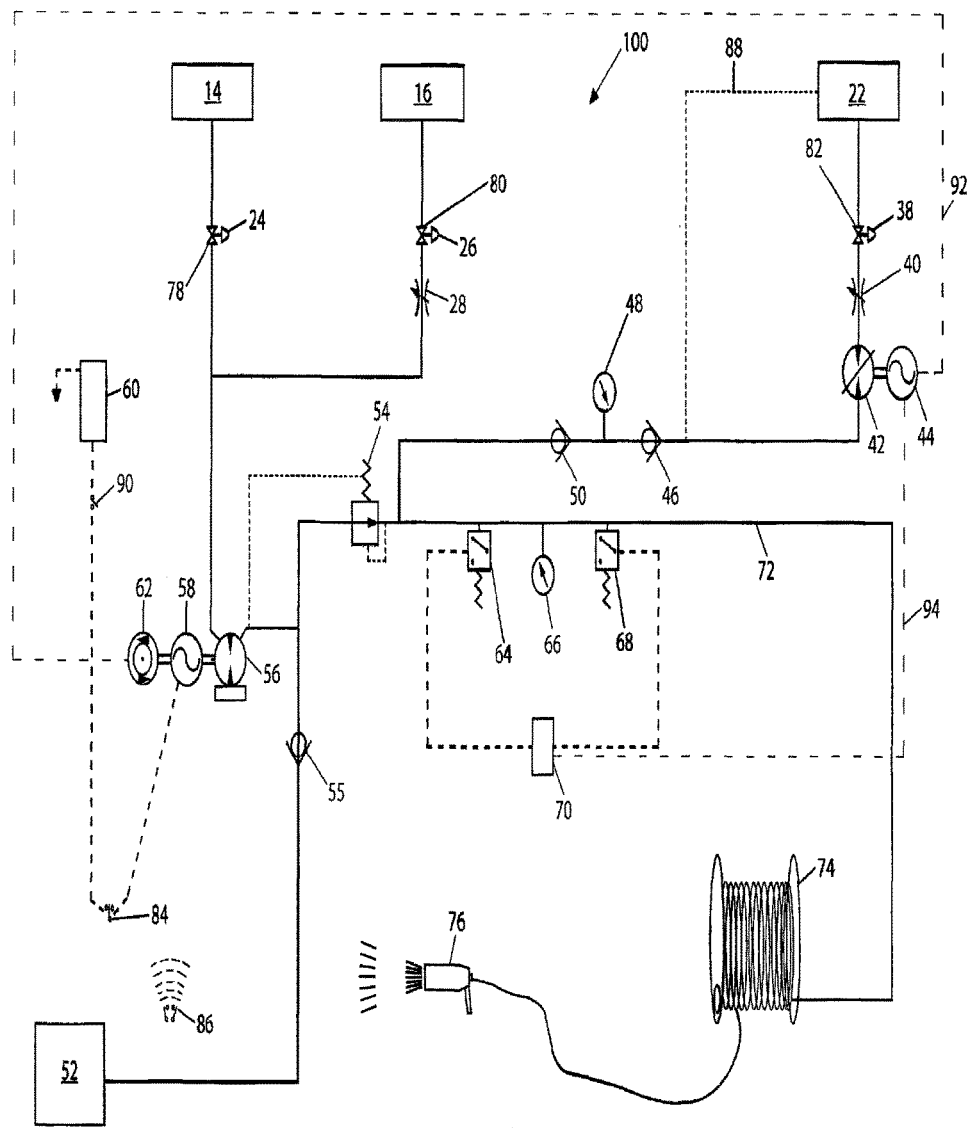
FIG. 2 is a preferred embodiment of the schematic diagram of a schematic flowchart of a system for diluting multiple chemical concentrates and dispersing utilizing a single portable source that is generally shown in FIG. 1 and is associated of the present invention.

Referring now to FIG. 2, which is the preferred embodiment that only utilizes three (3) containers of chemical concentrate, i.e., 14, 16, and 22. The only other differences include a first electric toggle switch 78 electrically connected to the first control valve 24, a second electric toggle switch 80 electrically connected to the second control valve 26, and a third electric toggle switch 82 electrically connected to the fifth control valve 38 for the electrical control and operation thereof. Optionally, there is a wireless controller 86 for activating or starting the motor 58, and potentially and optionally throttling the motor 58 as well as operating toggle switches 78, 80, and 82 for selective release of the concentrated chemicals. There is a battery disconnect switch 84 located between the battery 60 and the motor 58 to provide the ability to disconnect the current coming from the battery 60. In addition, the motor 58 can be started with a wireless controller 86. There is also a LOTO battery disconnect switch 90 located near the battery 60 and in electrical connection thereto. This LOTO battery disconnect switch 90 allows current to start the motor 58 after the motor 58 is primed and the controls allow fuel to flow to the motor 58. The battery disconnect switch 84 and the wireless controller 86 both can operate as starters for the motor 58 with the wireless controller 86 also optionally being to function in throttling the motor 58 and controlling the speed thereof. Altering the speed of the motor 58 provides adjustment for the manual fluid pressure adjustment valve 54.

Illustrative, but nonlimiting, examples of toggle switches 78, 80 and 82 include those made by Waytek, Inc., having a place of business at 2440 Galpin Court, Chanhassen, Minn. 55317. An illustrative, but nonlimiting, example of a first electric toggle switch 78 and a wireless controller 86 includes that manufactured by Control All Wireless DLM Inc., having a place of business at 311 $2^{nd}$ Street SW, Buffalo, Minn. 55313. An illustrative, but nonlimiting type of wireless controller 86 is the five (5) button SALTSANDERMD™ controller unit designed for gas engine driven de-icing equipment such as salt sanders that is manufactured by Control All Wireless DLM Inc. The current controls utilized for de-icing include a spreader on/off, speed, engine starting, engine stopping, throttling up, and throttling down. However, additional buttons, e.g., eight (8) or more, and latching circuits, e.g., three (3) or more, would be preferred.

An illustrative, but nonlimiting, example of a LOTO battery disconnect switch 90 is manufactured by Flaming River Industries, Inc., having a place of business at 800 Poertner Drive, Berea, Ohio 44017.

Therefore, the general chemical dispersion system utilizing multiple liquid chemical concentrates with a single source 10 is capable of mixing a number of flowable but incompatible liquid or fluid concentrates with solvent or diluent at differing prescribed mixing ratios by merely altering the control valves 24, 26, 30, 34, and 38, as shown in FIG. 1, to provide multiple chemicals. Long-term fire retardant, Class A and Class B firefighting foam and gel are examples of those materials that can be used in the described system. This combined on-demand type of dilution and dispersion system can include any number of concentrated liquid chemical containers for any number of agent concentrates. If being used in firefighting, the type of agent, the dilution ratio, and the rate of application is controlled by the fireman. The agent solution can be applied directly or indirectly to suppress a fire or protect property from an advancing fire or from accidental ignition sources. This chemical dispersion system utilizing multiple liquid chemical concentrates is also unique in that it does not require flushing of one concentrate or solution from the hardware prior to introducing another, even when the concentrates and solutions are chemically or physically incompatible, and can replace multiple separate systems. There are a wide range of liquid concentrates that can be utilized in the present invention including concentrated aqueous suspensions in which some components are insoluble and some components do not dissolve (guar or xanthan type thickeners) and become activated until a diluent or solvent, e.g., water, reduces the ionic strength of the solution. In another case, the chemical concentrate will contain a super absorbent polymer (SAP) suspended in mineral and vegetable oils; the SAP will not be activated to form a gel until diluent or solvent, e.g., water, is added.

For a firefighting application, there are many variables that are encountered in firefighting operations. These include differing fuel types, porosities and geometries, atmospheric conditions (heat, wind, and humidity), accessibility of the location, as well as the strategy and tactics of the attack. The combination of conditions cannot often be anticipated in advance of being dispatched to the fireground. Consequently, it is desirable to have all of chemical tools available so that their use can be momentarily switched from one agent to the other depending on the immediate situation.

Firefighting agents are generally received by the fireman as chemical concentrate that must be mixed with a diluent or solvent to prepare the firefighting solution prior to use. These chemical concentrates and, in some cases, their solutions, are incompatible with the other and must not be intermixed. Furthermore, each of the liquid chemical agent concentrate is mixed with diluent or solvent at unique and different ratios, e.g, weight or volume per unit volume of diluent. In order to accomplish this, each chemical agent has historically required a unique mixing or blending system. The logistics of having multiple hardware systems available a moment's notice, often in remote and difficult terrain, has precluded having the availability multiple chemical agents. Thus, for a fire application, the fireman has been required to pre-determine which chemical agent he or she will utilize prior to dispatch. This often results in having the least desirable agent being utilized in a given situation.

In practice, the different liquid chemical agents are mixed with water to produce a solution exhibiting optimum performance. Each of the chemical concentrates is typically mixed at a ratio that can be quite different. Illustrative, but nonlimiting, examples include volumes of the agent concentrate is generally mixed with one (1) volume of water from the variable capacity diluent or solvent container 52; two (2.0) to eight (8.0) volumes of long-term retardant concentrate from the first concentrated liquid chemical container 14; 0.1 to one (1) volume of Class A foam concentrate from the second concentrated liquid chemical container 16; one (1.0) to six (6.0) volumes of Class B foam concentrate from the third concentrated liquid chemical container 18; and 0.1 to four (4.0) volumes of water-enhancing gel concentrate from the fifth concentrated liquid chemical container 22, as shown in FIG. 1.

Furthermore, the mix ratios for each of the chemical agents are often varied in order to obtain optimum performance when used for a particular type of firefighting activity. The proportioning devices incorporated in the chemical dispersion system utilizing multiple chemical concentrates with a single source of this present invention is capable of providing solutions with all of these various mix ratios.

Additional applications for the present invention include utilizing dilute fire gel (napalm) with flammable liquids for use in back-firing operations during firefighting or prescribed burning operations. An additional application would be horticulture use for the proportioning of herbicides and insecticides for professional users for use in gardens, parks, and other large land areas and agricultural uses. There is also potential for military, civil protection and U.S. Environmental Protection Agency to disperse multiple chemicals for biological, nuclear, chemical decontamination or neutralization uses.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A system for diluting concentrated liquids and dispersing resultant solutions comprising:
   a plurality of concentrated liquid chemical containers;
   a plurality of control valves each correspondingly connected to the plurality of concentrated liquid chemical containers and in fluid relationship therewith;
   a single high pressure pump connected to each of the plurality of control valves and in fluid relationship therewith, wherein the plurality of control valves are connected between the plurality of concentrated liquid chemical containers and the single high pressure pump such that when the single high pressure pump is energized, the single high pressure pump solely draws the concentrated liquid chemicals from the plurality of liquid chemical containers through the corresponding control valves;
   a liquid pressure adjustment valve connected to both the single high pressure pump and a source of diluent or solvent and in fluid relationship;
   a hose connected to the liquid pressure adjustment valve and in fluid relationship; and
   a nozzle connected to the hose and in fluid relationship for dispersing a diluted solution, wherein the hose is connected between the liquid pressure adjustment valve and the nozzle.

2. The system for diluting concentrated liquids and dispersing resultant solutions as set forth in claim 1, further comprising utilizing the system for diluting concentrated liquids and dispersing resultant solutions in the field of at least one of firefighting, agriculture, horticultural and decontamination or neutralization of chemicals, biological agents and nuclear material.

3. The system for diluting concentrated liquids and dispersing resultant solutions as set forth in claim 1, further comprising at least one metering device located between at least one control valve of the plurality of control valves and the single high pressure pump and in fluid relationship.

4. The system for diluting concentrated liquids and dispersing resultant solutions as set forth in claim 1, further comprising at least one additional concentrated liquid chemical container and a positive displacement pump with a control valve located between the additional concentrated liquid chemical container and the positive displacement pump and in fluid relationship, wherein the positive displacement pump provides the at least one additional concentrated liquid chemical to the hose.

5. The system for diluting concentrated liquids and dispersing resultant solutions as set forth in claim 4, further comprising a motor connected to the positive displacement pump.

6. The system for diluting concentrated liquids and dispersing resultant solutions as set forth in claim 4, further comprising at least one check valve located between the positive displacement pump and the liquid pressure adjustment valve and connected thereto in fluid relationship.

7. The system for diluting concentrated liquids and dispersing resultant solutions as set forth in claim 4, further comprising a first check valve connected to the positive displacement pump and in fluid relationship, a liquid pressure gauge connected to the first check valve and in fluid relationship and a second check valve connected to the liquid pressure gauge and the liquid pressure adjustment valve and in fluid relationship.

8. The system for diluting concentrated liquids and dispersing resultant solutions as set forth in claim 1, further comprising a motor connected to the single high pressure pump.

9. The system for diluting concentrated liquids and dispersing resultant solutions as set forth in claim 8, further comprising a battery electrically connected to the motor.

10. The system for diluting concentrated liquids and dispersing resultant solutions as set forth in claim 8, further comprising a generator electrically connected to the electric motor.

11. The system for diluting concentrated liquids and dispersing resultant solutions as set forth in claim 8, further comprising a battery and a generator electrically connected to the electric motor.

12. The system for diluting concentrated liquids and dispersing resultant solutions as set forth in claim 1, further comprising a maximum liquid pressure sensor connected to the liquid pressure adjustment valve and in fluid relationship, a minimum liquid pressure sensor connected between the maximum liquid pressure sensor and the nozzle and in fluid relationship.

13. The system for diluting concentrated liquids and dispersing resultant solutions as set forth in claim 1, further comprising a reel for use and storage of the hose.

14. The system for diluting concentrated liquids and dispersing resultant solutions as set forth in claim 1, wherein the nozzle provides a variable flow pattern.

15. The system for diluting concentrated liquids and dispersing resultant solutions as set forth in claim 14, wherein the variable flow pattern can be provided by operator adjustment.

16. The system for diluting concentrated liquids and dispersing resultant solutions as set forth in claim 1, wherein the nozzle includes a spray wand gun.

17. The system for diluting concentrated liquids and dispersing resultant solutions as set forth in claim 1, further comprising at least one toggle switch electrically connected to at least one control valve of the plurality of control valves.

18. The system for diluting concentrated liquids and dispersing resultant solutions as set forth in claim 8, further comprising a wireless controller to initiate operation of the motor.

19. The system for diluting concentrated liquids and dispersing resultant solutions as set forth in claim 1, further comprising a storage container to provide the diluent or solvent.

20. The system for diluting concentrated liquids and dispersing resultant solutions as set forth in claim 19, further comprising a check valve connected to the storage container and in fluid relationship.

21. The system for diluting concentrated liquids and dispersing resultant solutions as set forth in claim 19, wherein the diluent or solvent includes water.

22. The system for diluting concentrated liquids and dispersing resultant solutions as set forth in claim 19, wherein the diluent or solvent includes liquids with suspended solids.

23. A system for diluting concentrated liquids and dispersing resultant solutions comprising:
   a plurality of concentrated liquid chemical containers;
   a plurality of control valves each correspondingly connected to the plurality of concentrated liquid chemical containers and in fluid relationship therewith;
   at least one additional concentrated liquid chemical container;
   a positive displacement pump connected to the at least one additional concentrated liquid chemical container and in fluid relationship;
   a single high pressure pump connected to each of the plurality of control valves and in fluid relationship therewith; wherein the plurality of control valves are connected between the plurality of concentrated liquid chemical containers and the single high pressure pump such that when the single high pressure pump is energized, the single high pressure pump solely draws the concentrated liquid chemicals from the plurality of liquid chemical containers through the corresponding control valves;
   at least one metering device is connected between at least one control valve of the plurality of control valves and the single high pressure pump and in fluid relationship;
   a liquid pressure adjustment valve connected to the single high pressure pump, the positive displacement pump and a source of diluent or solvent and in fluid relationship;
   a hose connected to the liquid pressure adjustment and in fluid relationship; and
   a nozzle connected to the hose for dispersing a diluted solution and in fluid relationship, wherein the hose is between the liquid pressure adjustment valve and the nozzle.

24. The system for diluting concentrated liquids and dispersing resultant solutions as set forth in claim 23, further comprising utilizing the system for diluting concentrated liquids and dispersing resultant solutions utilized in the field of at least one of firefighting, agriculture, horticultural and decontamination or neutralization of chemicals, biological agents and nuclear material.

25. The system for diluting concentrated liquids and dispersing resultant solutions as set forth in claim 23, further comprising a control valve connected to the at least one additional concentrated liquid chemical container and in fluid relationship and a metering device connected between the control valve and the positive displacement pump and in fluid relationship.

26. The system for diluting concentrated liquids and dispersing resultant solutions as set forth in claim 23, further comprising a first check valve connected to the positive displacement pump and in fluid relationship, a liquid pressure gauge connected to the first check valve and in fluid relationship and a second check valve connected to the liquid pressure gauge and the liquid pressure adjustment valve and in fluid relationship.

27. The system for diluting concentrated liquids and dispersing resultant solutions as set forth in claim 23, further comprising an electric motor operatively connected to the single high pressure pump.

28. The system for diluting concentrated liquids and dispersing resultant solutions as set forth in claim 27, wherein the electric motor is electrically connected to at least one of a battery, a generator, and a wireless controller.

29. The system for diluting concentrated liquids and dispersing resultant solutions as set forth in claim 23, wherein the diluent or solvent includes water.

30. The system for diluting concentrated liquids and dispersing resultant solutions as set forth in claim 23, wherein the diluent or solvent includes liquids with suspended solids.

31. A method for diluting concentrated liquids and dispersing resultant solutions comprising:
   utilizing a plurality of concentrated liquid chemical containers each correspondingly connected to a plurality of control valves and in fluid relationship therewith;
   utilizing at least one additional concentrated liquid chemical container that is connected to a positive displacement pump and in fluid relationship therewith;
   utilizing a single high pressure pump that is connected to each of the plurality of control valves and in fluid relationship therewith to solely draw the concentrated liquid chemicals from the plurality of liquid chemical containers through the corresponding control valves, wherein the plurality of control valves are connected between the plurality of concentrated liquid chemical containers and the single high pressure pump;
   utilizing at least one metering device that is connected between at least one control valve of the plurality of control valves and the single high pressure pump and in fluid relationship;
   utilizing a liquid pressure adjustment valve connected to both the single high pressure pump, the positive displacement pump and a source of diluent or solvent and in fluid relationship; and
   utilizing a hose connected to the liquid pressure adjustment valve and in fluid relationship and having a nozzle connected to the hose for dispersing a diluted solution and in fluid relationship, wherein the hose is between the liquid pressure adjustment valve and the nozzle.

32. The method for diluting and dispersing chemicals as set forth claim 31, further comprising utilizing the system for diluting and dispersing chemicals utilized in the field of at least one of firefighting, agriculture, horticultural and decontamination or neutralization of chemicals, biological agents and nuclear material.

33. The method for diluting concentrated liquids and dispersing resultant solutions as set forth in claim 32, further comprising utilizing a first check valve connected to the positive displacement pump and in fluid relationship, a liquid pressure gauge connected to the first check valve and in fluid relationship and a second check valve connected to the liquid pressure gauge and the at least one liquid pressure adjustment valve and in fluid relationship.

34. The method for diluting concentrated liquids and dispersing resultant solutions as set forth in claim 32, further comprising utilizing an electric motor operatively connected to the single high pressure pump.

35. The method for diluting concentrated liquids and dispersing resultant solutions as set forth in claim 34, wherein the electric motor is electrically connected to at least one of a battery, a generator and a wireless controller and the positive displacement pump is attached to a motor.

36. The system for diluting concentrated liquids and dispersing resultant solutions as set forth in claim 1, wherein the plurality of control valves are connected directly downstream of their corresponding concentrated liquid chemical containers.

\* \* \* \* \*